MEANS FOR DIRECTING AND AUTOMATICALLY CONTROLLING AIRCRAFT

Original Filed Oct. 25, 1947 9 Sheets-Sheet 1

William R. Winslow INVENTOR.

BY Philip S. Hoffman Atty.

MEANS FOR DIRECTING AND AUTOMATICALLY CONTROLLING AIRCRAFT
Original Filed Oct. 25, 1947 9 Sheets-Sheet 2
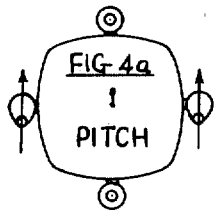
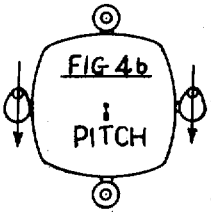
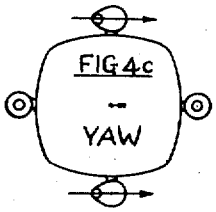
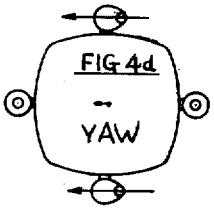
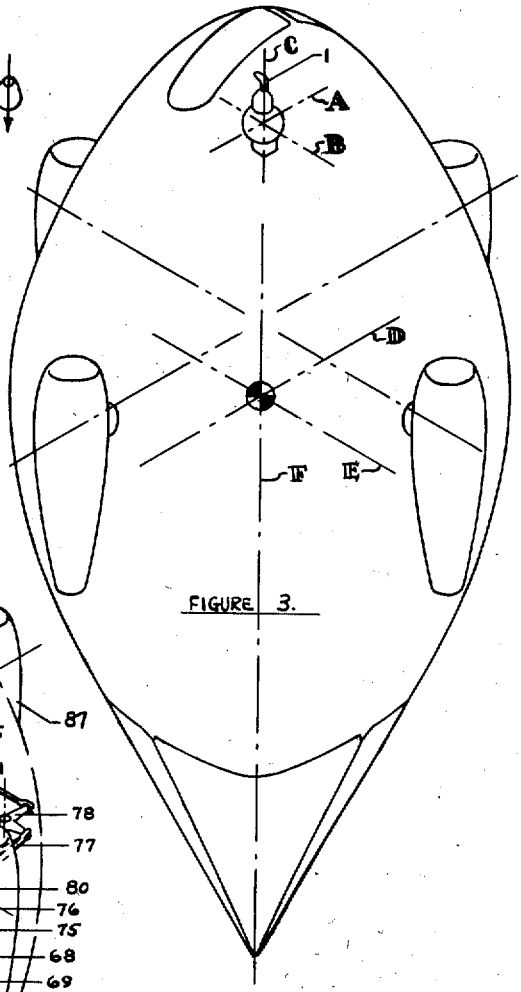
FIGURE 3.
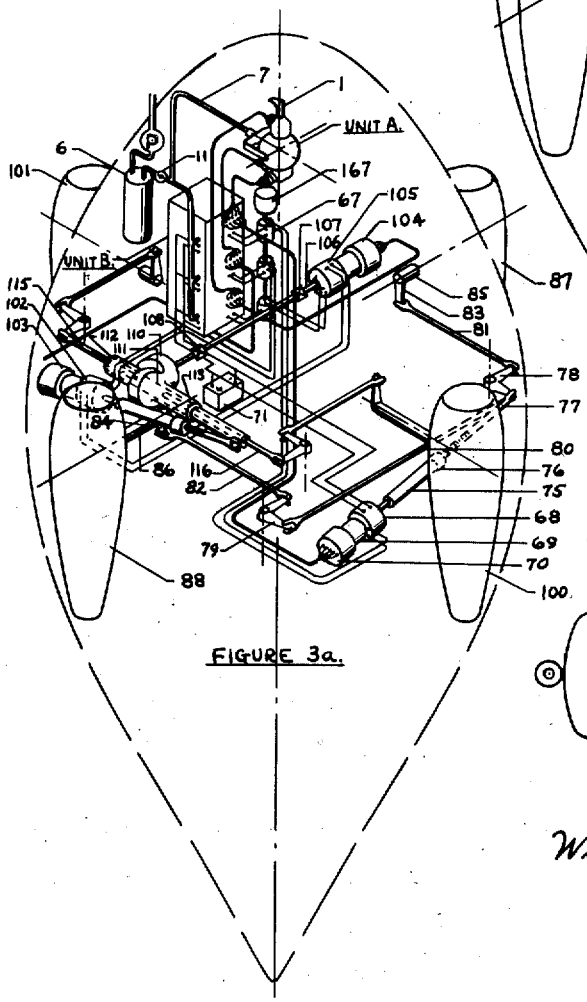
FIGURE 3a.
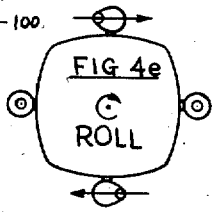
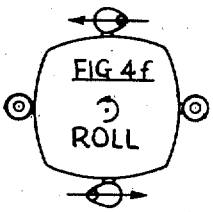
William R. Winslow INVENTOR.
BY Philip S. McLean Atty.

MEANS FOR DIRECTING AND AUTOMATICALLY CONTROLLING AIRCRAFT

Original Filed Oct. 25, 1947 9 Sheets-Sheet 3

William R. Winslow-INVENTOR.

BY Philip S. McLean
Atty.

MEANS FOR DIRECTING AND AUTOMATICALLY CONTROLLING AIRCRAFT

Original Filed Oct. 25, 1947 9 Sheets-Sheet 4

William R. Winslow-INVENTOR.

BY Philip S. McLean

MEANS FOR DIRECTING AND AUTOMATICALLY CONTROLLING AIRCRAFT
Original Filed Oct. 25, 1947 9 Sheets-Sheet 5
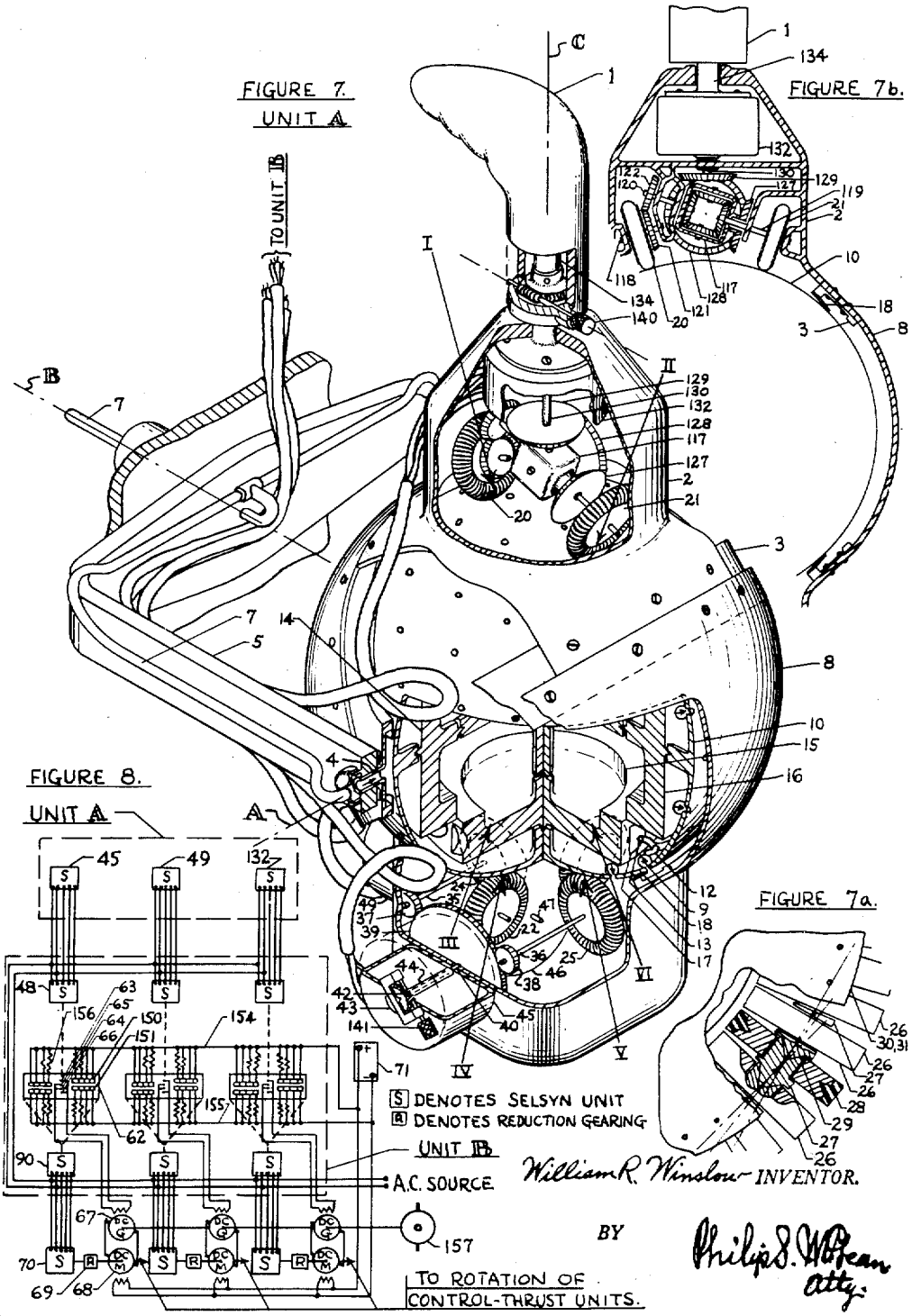
William R. Winslow INVENTOR.
BY Philip S. McLean Atty.

MEANS FOR DIRECTING AND AUTOMATICALLY CONTROLLING AIRCRAFT
Original Filed Oct. 25, 1947 9 Sheets-Sheet 6
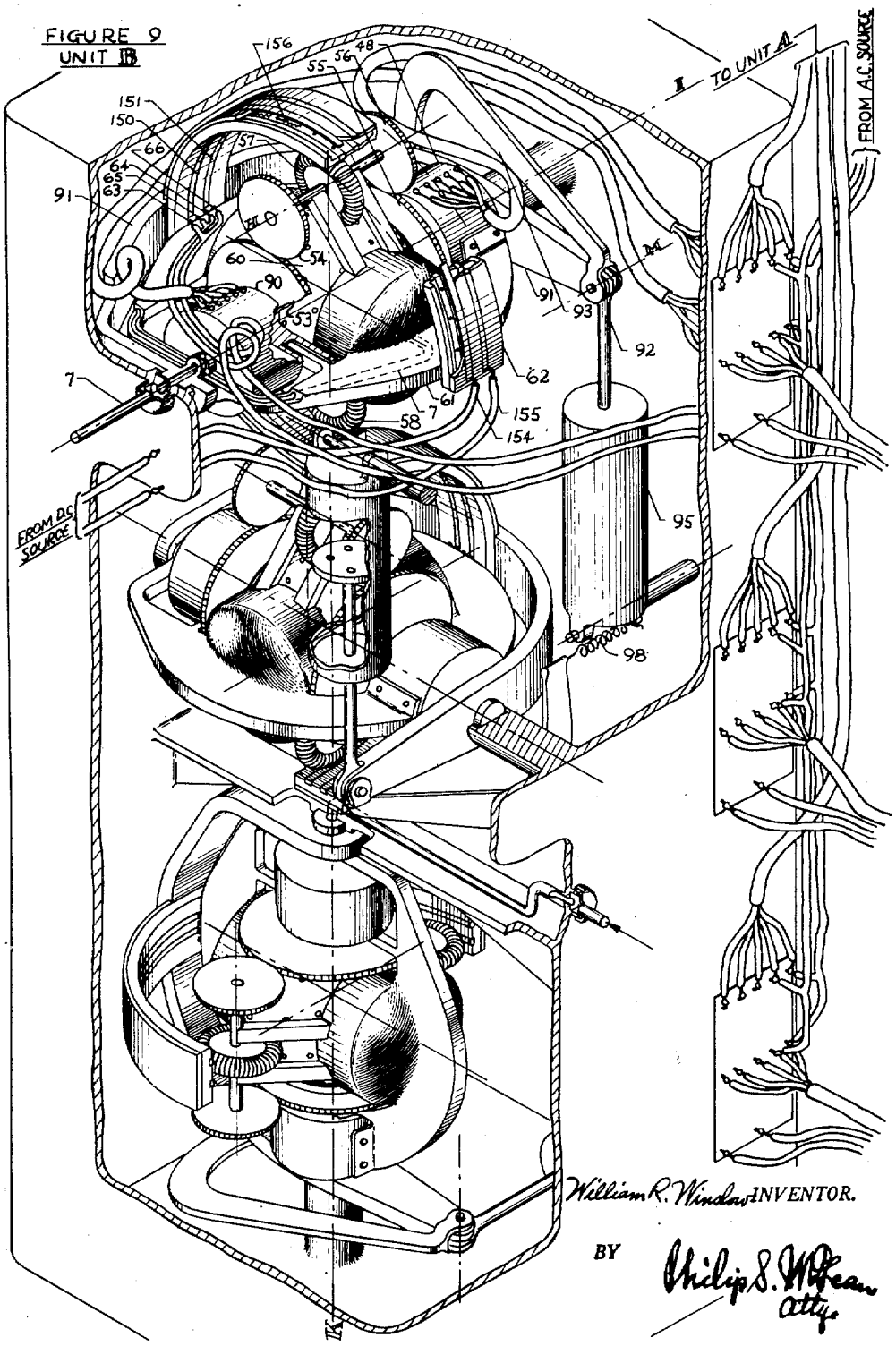
William R. Winslow INVENTOR.
BY Philip S. McLean Atty.

MEANS FOR DIRECTING AND AUTOMATICALLY CONTROLLING AIRCRAFT

Original Filed Oct. 25, 1947 9 Sheets-Sheet 7

William R. Winslow-INVENTOR.

BY Philip S. McKean
Atty.

MEANS FOR DIRECTING AND AUTOMATICALLY CONTROLLING AIRCRAFT
Original Filed Oct. 25, 1947 9 Sheets-Sheet 8
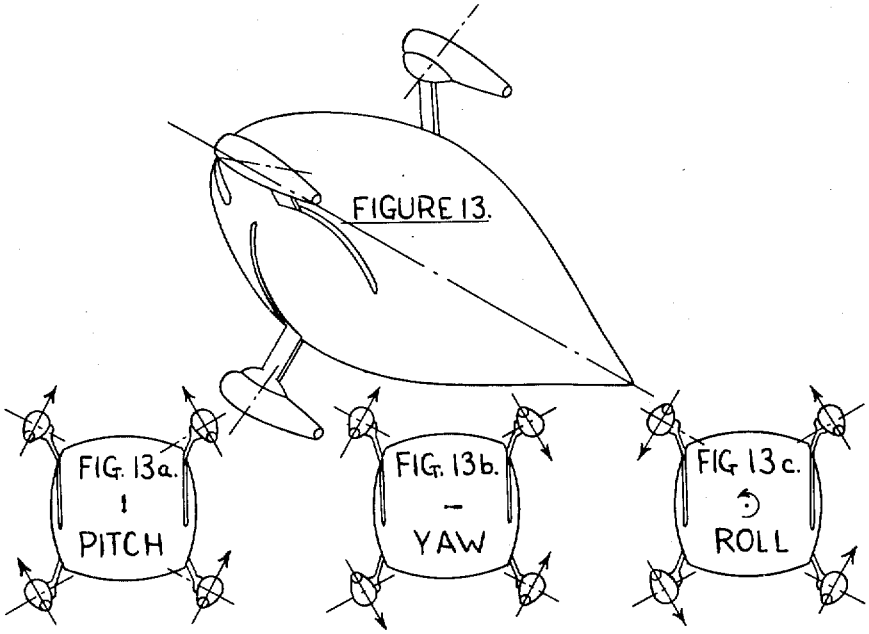
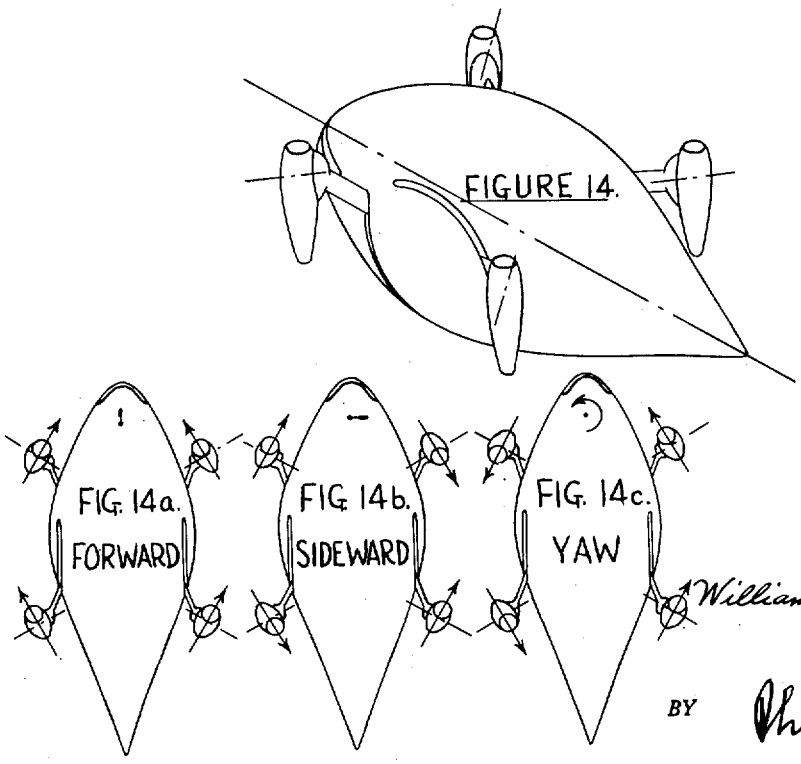
William R. Winslow
INVENTOR.
BY Philip S. McJean
atty.

MEANS FOR DIRECTING AND AUTOMATICALLY CONTROLLING AIRCRAFT

Original Filed Oct. 25, 1947 9 Sheets-Sheet 9

SECTION X-X

UNIT C

William R. Winslow-INVENTOR.

BY Philip S. McGeam
Atty.

United States Patent Office

Re. 23,936
Reissued Feb. 1, 1955

23,936

MEANS FOR DIRECTING AND AUTOMATICALLY CONTROLLING AIRCRAFT

William R. Winslow, North Tonawanda, N. Y.

Original No. 2,552,359, dated May 8, 1951, Serial No. 782,090, October 25, 1947. Application for reissue May 6, 1952, Serial No. 286,322

4 Claims. (Cl. 244—79)

Figure 1:
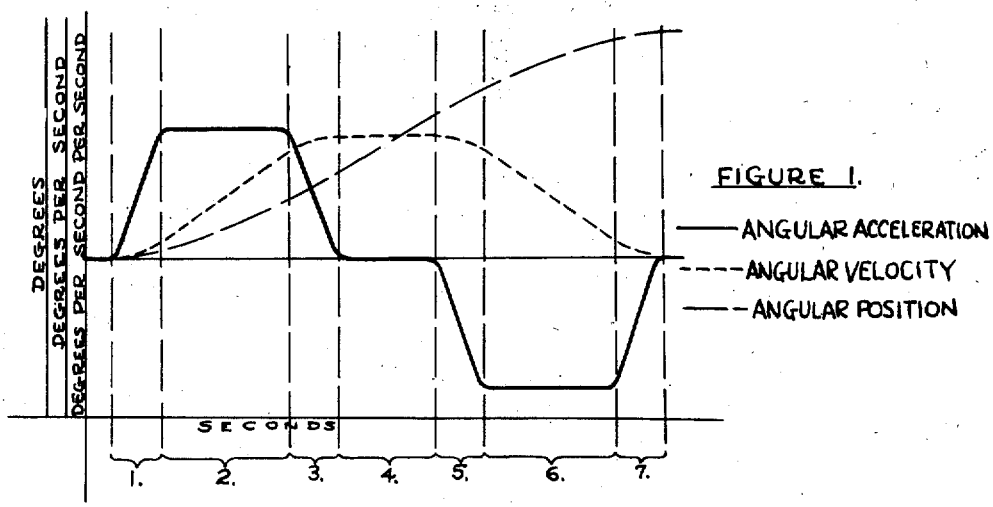

Matter enclosed in heavy brackets [ ] appears in the original patent but forms no part of this reissue specification; matter printed in italics indicates the additions made by reissue.

I. OBJECTS AND GENERAL DEFINITION OF THE INVENTION

This invention relates to a method for effecting attitude control of aircraft and particularly to a method by the pilot of directing the aircraft's attitude, and to a means for automatic control of angular acceleration of the aircraft to bring about the attitude directed by the pilot.

(a) The invention has as an object one of effecting automatic regulation of angular acceleration about the lateral, vertical and longitudinal axes or the lateral and vertical axes of an aircraft such that a desired attitude in space of the aircraft may be directed and set by the pilot, and whereupon the actual attitude of the aircraft is caused to conform to such attitude setting.

(b) The invention has as a further object a mechanical means for providing automatic regulation of the angular acceleration required in a directed change in the aircraft's attitude, wherein the desired attitude of the aircraft is set by the pilot on an "attitude control lever," and whereupon by such action, an action of an automatic control mechanism causes the aircraft's angular acceleration and angular velocity to vary in such a way as to align the direction in pitch and yaw and attitude in roll of the aircraft with the direction and roll attitude setting of the attitude control lever.

(c) A further object of the invention lies in a feature of the operation of the attitude control lever which embodies a new and unique method of control wherein the pilot sets the attitude control lever's longitudinal direction and attitude in space at the longitudinal direction and roll attitude desired of the aircraft, and by such action, the longitudinal direction and roll attitude in space of the aircraft is automatically caused to align itself with and to remain at the direction and attitude in space at which the control lever is set.

This method of control is differentiated from other methods of control primarily by the fact that a desired aircraft attitude in space is set by the pilot, while other methods involve the pilot's manipulation of the aircraft's angular acceleration.

This invention embodies a mechanical means for accomplishing directional control of an aircraft, consisting of an arrangement of four thrust-producing units which serve a dual purpose of (1) maintaining directional control by assisting in the angular movement of the aircraft about any one or combination of its three principal axes and (2) providing force of thrust as a means of propulsion. In the discussion which follows, these units will be referred to as "control-thrust units."

(d) A further object of the invention lies in an optional feature which embodies the omission of the separate and distinct parts of the apparatus which serve to provide means for setting and automatically controlling the roll attitude of the aircraft, provided that, in the case of such an omission, the attitude in roll of the aircraft is controlled by a further and separate automatic means which serves to regulate the aircraft's roll attitude to the correct angle of bank in turns and other normal flight maneuvers.

(e) A further object of the invention is a mechanical means by which the main body of the aircraft can, at the will of the pilot, be caused to remain in an approximately horizontal attitude while the aircraft's forward speed is reduced to zero; and by which, at a mechanical configuration of said means for zero velocity or hovering, flight, the directional heading of the aircraft and the sideward or fore-and-aft direction and speed of the aircraft in an approximately horizontal plane is controllable by the pilot; and by which, during the transition of the mechanism between the configurations for fully controllable attitude (as in object b) and for the above described configuration for hovering or slow horizontal flight, the same control hand-lever is effectively operable by the pilot; and by which, during such transition and at either of the two said configurations, simple and natural motions and directions of motion of the hand-lever serve to govern the aircraft's attitude.

In an aircraft embodying the invention as characterized in objects (a) to (c), the following advantages are intended: (1) Automatic maintenance of any direction and attitude of flight; (2) maintenance of direction and attitude of flight independently of the effect of gravity; (3) in the maintenance of direction and attitude of flight, a feature of operation of the automatic control mechanism which reduces the aircraft's tendency to "hunt" in automatic flight, that is, in the automatically controlled rotation of the aircraft toward the attitude set upon the control level, the tendency of the aircraft to rotate boynd the particular set direction, resulting in undue oscillation; (4) a feature of automatic operation of control, wherein the mechanism, upon direction by the pilot, carries out an automatically controlled change in the direction and/or attitude of the aircraft; (5) simplicity of control operation, whereby the pilot's direction of a change of attitude consists of one motion of a hand-lever which may be executed without the necessity of his consideration of time or the suddenness with which the motion is made; (6) simplicity of control operation, whereby a change in the direction or attitude of the attitude control lever causes to be brought about an exact duplication of this change upon the aircraft's attitude; (7) simplicity of control operation, whereby attitude changes of a faster or slower speed than that of an automatic change are made by a manipulation of the attitude control lever in a way similar to that of the conventional (acceleration control) stick; (8) simplicity of control operation, wherein the attitude control lever, once set at a direction and/or attitude of the aircraft, returns automatically to its neutral position with respect to the aircraft as the aircraft automatically completes the maneuver; (9) with a suitable arrangement of the control-thrust units, a feature of the action of the automatic mechanism which causes rotations of the control-thrust units to automatically compensate and nullify the effects on the aircraft's attitude as might be caused by changes in loading and balance of the aircraft in flight, outside disturbances such as gusts, or fluctuations and partial loss of thrust at one or more of the control-thrust units. The ability of the automatic mechanism to compensate a large or complete loss of thrust at one of the units would depend upon an appropriate aircraft design, or upon the pilot's adjustment of the thrust of the remaining units.

In an aircraft embodying the invention as characterized in objects (a) to (d), the following advantages are intended: (1) The above listed nine advantages, substantially as stated with the exception of references to the control of roll attitude; (2) added simplicity of control operation, as manifested in the elimination of manual control of roll attitude and the substitution of same by automatic control of roll attitude.

Figure 10:
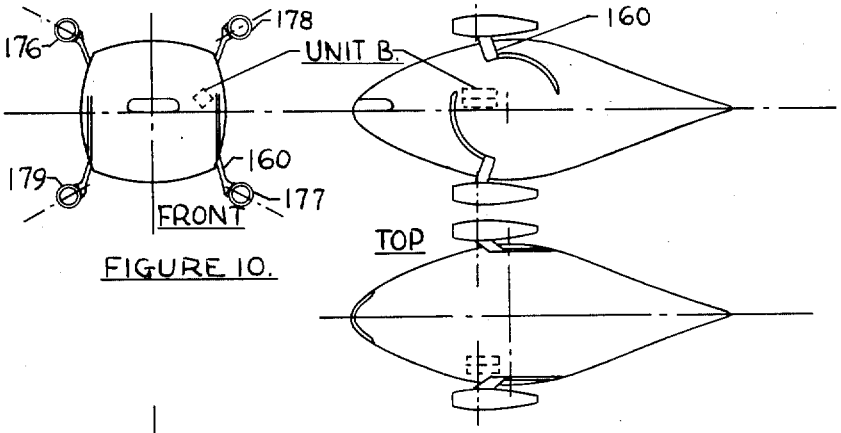

In an aircraft embodying the invention as characterized in objects (a) to (c) and (e), and having a mechanical construction as illustrated in Figure 10, and in the configurations as stated below, the following advantages are intended: (1) In the mechanical configuration for controllable attitude flight (see Figure 10), the above listed nine advantages; (2) in the mechanical configuration for slow or hovering horizontal flight (see Figure 11), the advantages of crew and passenger comfort and ease of cargo stowage made possible by the constantly maintained horizontal attitude of floors, seats, etc.; (3) in the configuration for controllable attitude flight or in the configuration for slow or hovering horizontal flight or in a configuration for a transition between these two manners of flight (see Figure 12), the advantage of simplicity of control, whereby a basically similar relationship exists between rotations of the control hand-lever and the subsequent rotations of the aircraft.

Figure 1A:
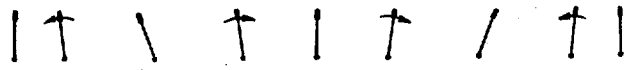
Figure 2:
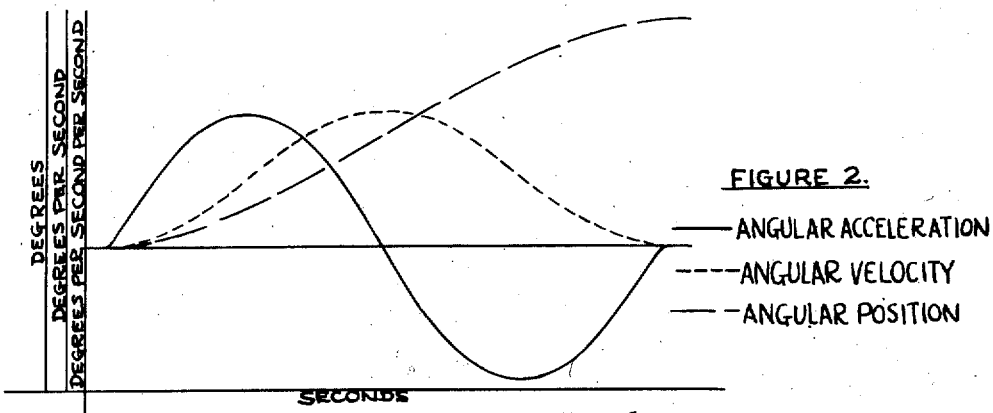
Figure 2A:
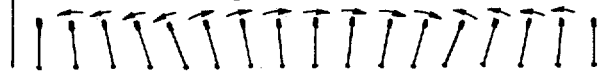
Figure 2B:
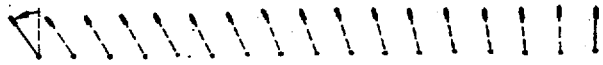
Figure 5:
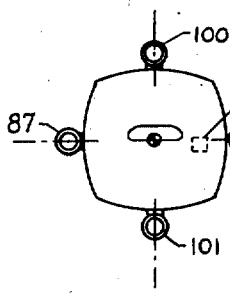
Figure 6:
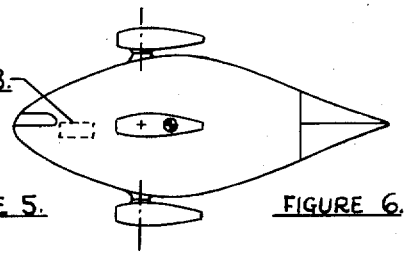
Figure 5A:
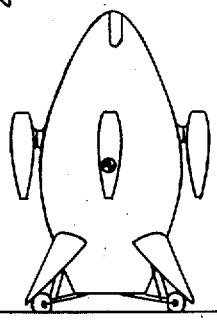
Figure 11:
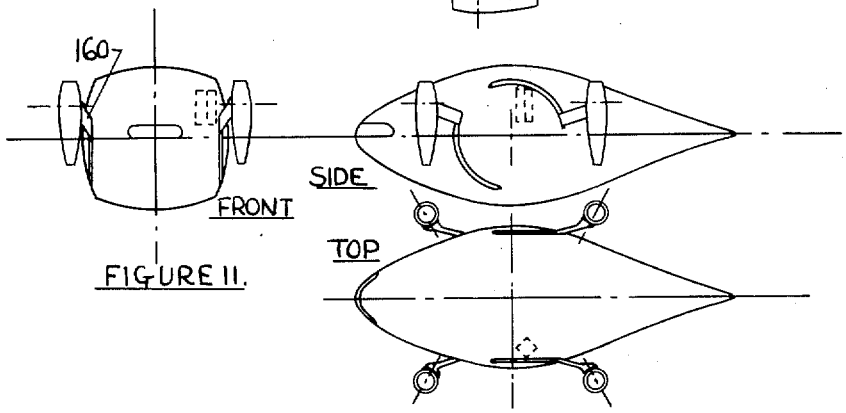
Figure 15:
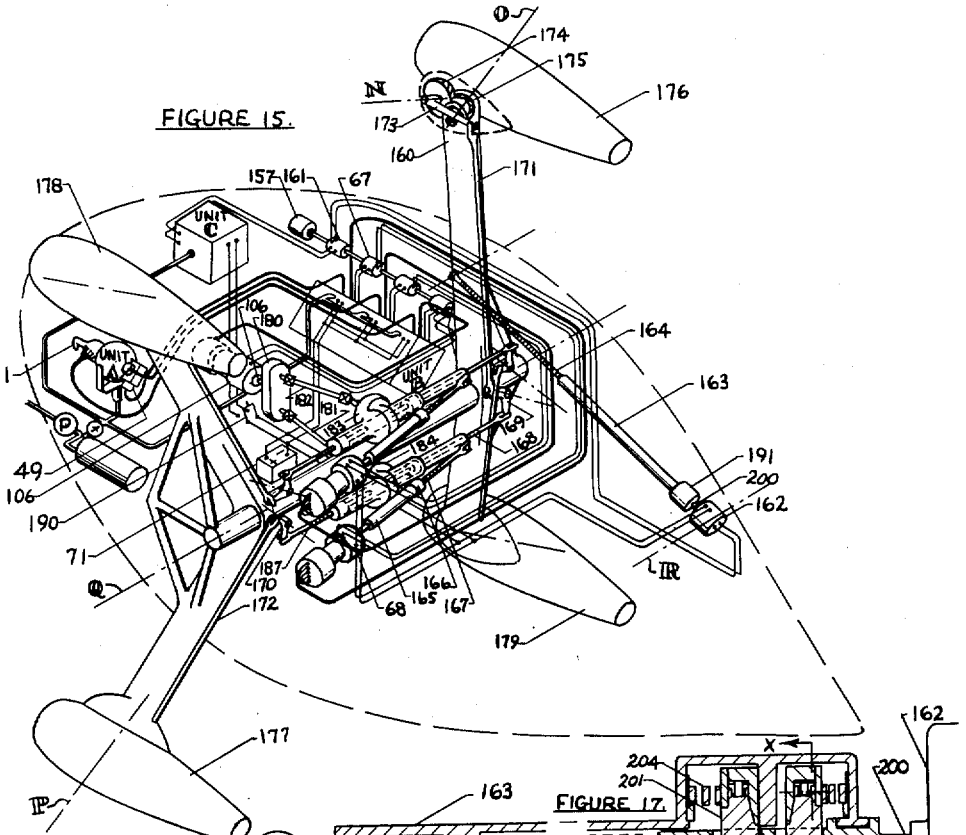
Figure 17:
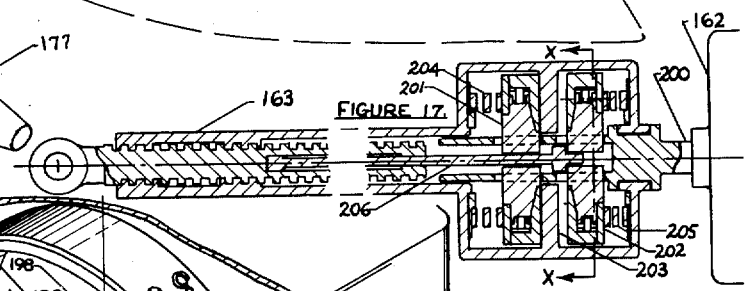
Figure 18:
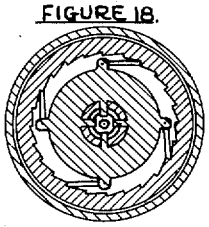
Figure 16:
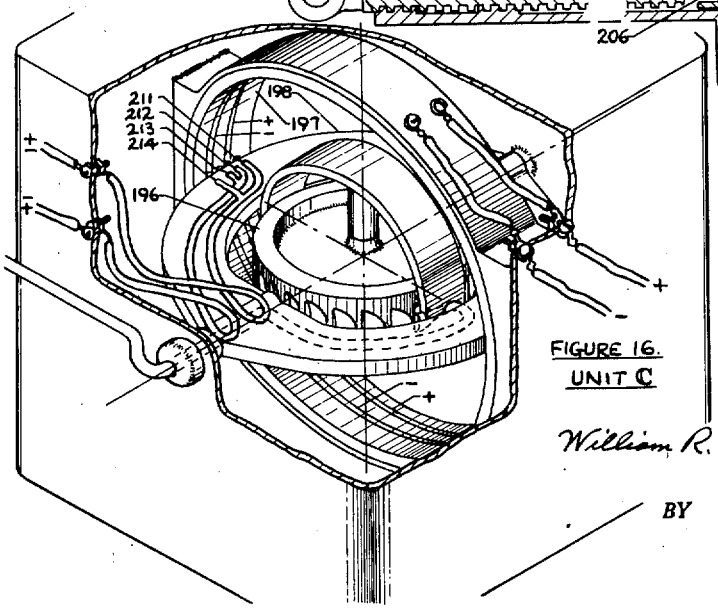

In the drawings accompanying and forming part of this disclosure, Figure 1 is a schematic representation of angular acceleration, angular velocity, and angular position plotted against time, showing in seven distinct steps the variations in the plotted values during a simple (two dimensional) change of direction; Figure 1a is an illustration of the seven control stick positions and motions corresponding to the seven steps represented in Fig. 1; Figure 2 is a graphical representation of angular acceleration, angular velocity and angular position plotted against time, showing the variations in the plotted values characteristic of an ideally executed change of direction; Figure 2a is an illustration of the control stick motion corresponding to the variations shown graphically in Fig. 2; Figure 2b is an illustration of the setting of the attitude control lever at roughly forty degrees angular displacement, and its automatic return to the neutral position while the aircraft completes the maneuver; Fig. 3 is an illustration showing the external front and side views of an aircraft embodying the invention; Figure 3a is an isometric drawing of the exterior of an aircraft embodying the invention and showing a possible arrangement of four control-thrust units; Figures 4a to 4f are illustrations of the aircraft, as viewed from the rear, indicating the motion of the attitude control lever and the corresponding initial motions of the control-thrust units in the following six basic attitude changes: (a) upward pitch, (b) downward pitch, (c) right yaw, (d) left yaw, (e) right roll, and (f) left roll; Figures 5 and 6 are front and side views, respectively, of the aircraft; Figure 5a is an illustration showing the external side view of an aircraft embodying the invention, with the aircraft in a take-off or landing attitude; Figures 6a to 6g are diagrammatic views illustrating different operations of the aircraft; *Fig. 6h is a schematic view showing arrangement of the parts illustrated in Figs. 6a to 6g;* Figure 7 is an isometric drawing of unit A of which the attitude control lever is a part; Figure 7a is a detail drawing of one of the composite wheels 20 to 25, showing in cut-away the wheel, tire and axle; Figure 7b is a detail drawing of the working parts between wheels 20 and 21 and Selsyn 132, showing a cut-away view of differential 117 and the air pressure chamber between sphere 10 and jacket 8; Figure 8 is a schematic diagram of the electrical wiring and allied mechanical parts; Figure 9 is an isometric drawing of unit B containing, in detail as shown, the working parts of the automatic control mechanism; Figure 10 is an illustration showing the external front, side and top views of an aircraft embodying the invention, and in particular showing the rotatable control-thrust unit supporting structure in a configuration for fuselage attitude controlled flight; Figure 11 is an illustration showing the external front, side and top views of the aircraft of Fig. 10 with the rotatable control-thrust unit supporting structure in a configuration for hovering flight; Figures 12a to 12e are illustrations showing consecutive changes in configuration during the transition between horizontal flight at high speed and horizontal flight at hovering speed, and in particular showing schematically the function of unit C; Figure 13 is an isometric drawing of the aircraft of Figure 10 with the rotatable control-thrust unit supporting structure in a position for fuselage attitude controlled flight; Figures 13a to 13c are illustrations of the aircraft of Fig. 10, as viewed from the rear, indicating the motion of the attitude control lever and the corresponding initial motions of the control-thrust units in the following three attitude changes: (a) upward pitch, (b) left yaw, (c) right roll; Figure 14 is an isometric drawing of the aircraft of Fig. 10, with the rotatable control-thrust unit supporting structure in a configuration for hovering flight; Figures 14a to c are illustrations of the aircraft of Fig. 14, as viewed from the rear, indicating the motion of the attitude control lever and the corresponding initial motions of the control-thrust units in the following three motions of the aircraft: (a) forward, (b) sideward to the left, and (c) yaw to the right; Figure 15 is an isometric drawing of the mechanical parts which constitute the invention as is appropriate to the aircraft of Fig. 10; Figure 16 is an isometric drawing of unit C containing as shown in detail the working parts of the automatic mechanism which governs the angle between the control-thrust unit supporting structure and the fuselage in order to keep the fuselage in an approximately horizontal attitude; Figure 17 is a side elevation of clutch 191 and screw jack 163 showing the working parts in cross-section; and Figure 18 is a cross sectional view on line X—X of Fig. 17.

The purpose of the invention will be better understood after consideration of the position-time relationships involved in a controlled change of attitude.

II. ANALYSIS OF CONTROL OF THE ANGULAR ACCELERATION REQUIRED IN A SIMPLE CHANGE OF ATTITUDE

Due to its inertia an angularly motionless body sustained in a fluid, assumed in this analysis to be frictionless, possesses a tendency to remain in an angularly motionless position, or if possessed of a rotation, to rotate at an unchanging rate of rotation.

A conventional means for accomplising a change of attitude embodies the use of aerodynamic surfaces, whereby angular deflection of these surfaces serve to regulate the aircraft's angular acceleration.

Another such means might embody the use of thrust-producing units such as rockets or jets in place of aerodynamic surfaces, whereby the direction of their forces of thrust with respect to the center of mass of the aircraft would serve to regulate the aircraft's angular acceleration.

A normal procedure of control of angular acceleration followed in accomplishing a change of attitude is outlined in Figure 1, steps 1 to 7, and in the corresponding seven steps listed below: (An absence of stabilizing forces is assumed, such as would be the case in a frictionless medium. Also assumed are the initial conditions of zero angular acceleration and zero angular velocity.)

1. Movement of the control surface (or control-thrust unit) from a deflection angle of zero or neutral to a deflection angle in such a direction and to such a magnitude as is necessary to increase the angular acceleration from zero to a maximum value in the direction of the desired new attitude.

2. Continued application of the above deflection angle and its resulting acceleration for a duration of time necessary to produce a desirable angular velocity.

3. Return of the control surface (or control-thrust unit) to a neutral angle, thereby causing the angular acceleration to decrease to zero and the angular velocity to reach a maximum.

4. Estimation of the time required to be spent at the present angular velocity before angular deceleration is begun, taking into consideration (1) the angle between the present angular displacement of the aircraft's attitude and that of the desired new attitude, (2) angular velocity, and (3) an estimate of the angular displacement expected to be required in decelerating to zero angular velocity.

5. Movement of the control surface (or control-thrust unit) from its neutral angle to a reverse deflection angle of such magnitude as is necessary to increase the angular acceleration from zero to a desirable maximum in the direction opposite from the direction of angular velocity.

6. Continued application of the above reverse deflection angle, and the resulting deceleration, for a duration of time necessary to reduce the aircraft's angular velocity approximately to zero.

7. Return of the control surface to a zero deflection angle as the aircraft reaches the desired new attitude.

The above described control motions have been divided into seven steps in order to facilitate a simple analysis. The various positions and motions of a conventional type control corresponding to the above steps are shown in Figure 1*a*.

Under actual conditions, however, these seven steps are integrated into one smoothly coordinated maneuver. The angular acceleration, angular velocity and angular position in such a maneuver are illustrated in Figure 2. Figure 2*a* illustrates the corresponding motion of a conventional control stick or rudder pedal controlling angular acceleration, assuming an absence of stabilizing forces.

III. METHOD OF OPERATION OF A CONTROL LEVER FOR DIRECT CONTROL OF ATTITUDE

It is the primary purpose of the invention, as it is characterized in objects (a) to (c), to enable the pilot to set a so-called attitude control lever immediately at a desired aircraft direction and attitude in space, and to eliminate the necessity of the pilot's attention to the above listed and illustrated seven steps. According to the invention, the aircraft's angular acceleration, angular velocity and angular position are caused to vary automatically, bringing about the desired change of attitude. For example, the pilot rotates the attitude control lever to a direction of roughly forty degrees from the present direction of the aircraft. (See Fig. 2b.) Such a control setting may be made without regard to the suddenness with which the control lever is moved, since the suddenness of motion of the control lever does not effect the smoothness of execution of the automatically controlled change of attitude. The pilot, having thus "pointed out" his desired direction on the control lever, is relieved of any further necessary action. The aircraft's direction now moves automatically to the direction set on the control lever; the control lever automatically returns to its neutral position with respect to the aircraft; and the aircraft conforms to and remains for an indefinite length of time at the attitude last directed by the pilot.

The rate of automatic change of attitude will remain constant for any given change of attitude.

Faster attitude changes may be made at the will of the pilot by exaggerating the angular displacement of the control lever in the direction of the turn. In such a case the pilot must operate the attitude control lever in a way similar to that of the operation of a conventional control stick. That is, he must first make an exaggerated movement of the control lever in the direction of turn, and secondly, as he approaches his desired attitude, make a movement of the lever in the direction opposite from the aircraft's direction of rotation. As the turn is completed, he finally points the lever in the desired direction of flight.

Slower attitude changes may be made at the will of the pilot by a movement of the control lever to a relatively small displacement from its neutral position, and holding this displacement during the aircraft's rotation until the aircraft approaches the desired attitude. The pilot then releases the control lever at the desired direction and attitude of flight and allows it to return automatically to its neutral position.

Summarizing the method of operation of the attitude control lever, standard rate changes of attitude are made by angularly displacing the control lever in the same direction and to the same magnitude desired that the aircraft's attitude be displaced; all further control action is automatic. Faster or slower attitude changes are made by manipulating the attitude control lever in a way similar to that of the operation of a conventional (acceleration control) stick. In straight flight at any direction or attitude, automatic operation of the control mechanism causes the aircraft, without the attention of the pilot, to remain indefinitely in its present attitude.

IV. EXPLANATION OF MECHANICAL FUNCTIONS

1. BASIC CONTROL MECHANISM

The basic control mechanism, as characterized by objects (a) to (c) is substantially as shown in Figures 3 to 9.

Referring to Figures 3, 4a and 4b, rotation of the attitude control lever 1 about axis A brings about a similar pitching rotation of the aircraft about axis D at its center of mass. Referring to Figures 3, 4c, and 4d, rotation of the attitude control lever about axis B brings about a similar yawing rotation of the aircraft about axis E. Referring to Figures 3, 4e, and 4f, rotation of the attitude control lever about axis C brings about a similar rolling rotation of the aircraft about axis F.

In the detailed explanation which follows, certain mechanical changes as described are caused to be brought about by certain motions and directional settings of the attitude control lever. Reference is to be made to the general overall view of the control mechanism shown in Figure 3a and to Figures 6a to g which show schematically the primary working parts and a step-by-step representation of the functioning of the automatic control mechanism during a simple change of direction. This step-by-step representation applies, in essence, to automatic control of the aircraft about any of its three axes. A maneuver of the aircraft effecting a rotation about any one of these three axes, that is, a change of attitude, is accomplished as explained in the following illustrative example.

Figure 6A:
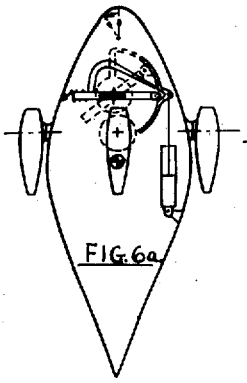

Referring to Figure 6a, the attitude control lever 1 is displaced to a direction roughly forty degrees from the direction of the aircraft. Referring to Figure 7, this displacement is seen as a motion of control lever 1, attached shell 2, frame 3 and connected parts about axis A and bearing 4 mounted on frame 5.

Referring to Figure 3a air pump P compresses air into storage tank 6. Compressed air flows from tank 6 by way of check valve 11 and lines 7 to the chamber between jacket 8 and sphere 10 in unit A (Fig. 7) and to the similar chambers contained in unit B (Fig. 9).

Referring to Figure 7, the compressed air in the chamber between jacket 8 and sphere 10 flows through a number of perforations in sphere 10, through valves typical of valve 9, through lines typical of line 12 to jets typical of jet 13. These jets discharge air against cups typical of cups 17 located around the peripheries of a number of gyroscopes typical of gyroscopes 14, 15, and 16, which rotate in three mutually perpendicular planes stationary with the structure of sphere 10. There is a check valve at each perforation in sphere 10. Some of these check valves allow air to pass into the sphere through lines to the various jets; the remainder allow air to escape from the space within the sphere. Hence, valves exposed to the high pressure air within the chamber between jacket 8 and sphere 10, such as valve 9, allow air to enter the sphere by way of the jets; valves not exposed to the high pressure air exhaust air from the sphere into the surrounding atmosphere. The rotation of the gyroscopes tends to give sphere 10 a relatively immovable attitude. Some of the high pressure air is expected to escape through the small space between sphere 10 and flexible sealing strips 18 on frame 3. In doing so, the escaping air helps to reduce friction between these two parts.

Sphere 10 is suspended within and in the center of frame 3 by means of forces I to VI exerted by six composite wheels 20, 21, 22, 23, 24 and 25. Each of the composite wheels is composed of a hub and a plurality of smaller wheels, such as wheel 26, mounted around their peripheries as shown in detail in Figure 7a. Each of the wheels, such as wheel 26, are composed of a circular disc hub, bearings 29, and tires 28 of hard rubber or some other friction surface. Each wheel rotates about an axle such as axle 27. Each of the axles 27 are fixed to discs 30 and 31. This particular construction of wheels 20 to 25 has the purpose of enabling the wheel to move freely sideways on sphere 10 but to retain traction as it rolls about its axle.

With the optional alteration of the invention as outlined in object (e), wheels 20 and 21 and allied parts are omitted. With this alteration of the mechanism, it is supposed that wheels 22 to 25, or similar motion-transmitting and sphere-supporting means, would be arranged in a different and more suitable manner than in the manner illustrated.

Continuing with the example maneuver, the movement of lever 1 and connected parts about axis A along the surface of sphere 10. Wheels 20, 21, 22, and 23 move sideward, rolling on the smaller wheels 26, and do not rotate about their individual axes. Wheels 24 and 25 rotate about axes 35 and 36, turning gears 37, 38, 39 and shaft 40. Also rotating with shaft 40 are worm and gear 42 and 43, hollow shaft 44 and Selsyn 45.

The rotation of Selsyn 45 is transmitted to and duplicated by [Selsyn 48] *the outer portion of Selsyn 48 while the inner portion is held rotationless as described in the following.* (See Fig 8 and Fig. 9.) Referring to Figure 9, [mounted on the axle] *rigidly secured to the axle of the inner portion* of Selsyn 48 is gear 55. *Gear 55 is paired with gear 56. Gear 56 and wheel 57 have equal diameter and are connected by means of an axle with its axis H. Sphere 60 has a construction and function similar to that of sphere 10. Wheel 57 rides on the surface of sphere 60 which maintains a rotationless attitude. Therefore wheel 57 in rolling, swings with gear 56, ring 61 and outer portion of Selsyn 48 about axis I, causing gear 55 whose diameter is equal to that of sphere 60, to remain rotationless.* [Gear 55 rotates gear 56 about axis H. The motion of gear 56 is transmitted to wheel 57 by means of their common axle. Wheel 58 also rotates with the wheel 57 by means of a similar gear arrangement beginning with gear 55. Held between wheels 57 and 58 is sphere 60. Sphere 60 has a construction and function similar to that of sphere 10. As wheels 57 and 58 rotate, sphere 60 maintains a relatively immovable attitude and thereby causes ring 61 to rotate about axis I.] Attached to ring 61 are four electrical conductor brushes 63, 64, 65, and 66.

As ring 61 rotates about axis I, brushes 63 and 64 slide along the cylindrical surface of arc 62, making electrical contact respectively with tracks 150 and 151. D. C. current, or some other suitable servo control current, now flows from an electrical source such as battery 71 (see Fig. 8), through conductors 154 and 155, through one of a plurality of resistances such as resistance 156, through tracks 150 and 151, through brushes 63 and 64, to the field winding of D. C. generators 67, which is driven by source of rotation 157. Thus exciting the field of generator 67, D. C. current flows from the armature of generator 67 to the armature winding of motor 68. It is to be pointed out here that a means of transmission other than the means described above might be used to perform the function of transmitting the control of motor 68, providing that the transmitted control is governed by the ring to arc displacement, or like displacement of parts, and having an effect similar to that which would be accomplished by the above described means. Referring to Figure 3a, motor 68 turns hollow sleeve 75 and nut 76 on screw 77, causing screw 77 to travel in the direction out of the sleeve. Bell cranks 78 and 79, rods 80, 81 and 82, and arms 83 and 84 move accordingly, rotating shafts 85 and 86 and control-thrust units 87 and 88.

The rotation of units 87 and 88 is transmitted from motor 68 through reduction gearing 69 to Selsyn 70. Selsyn 90 is connected electrically to Selsyn 70 and tends to duplicate the rotation of units 87 and 88. *Gear 54, wheel 57 and gear 56 are rigidly fixed to the same shaft along axis H. The inner portion of Selsyn 90 is mounted freely rotatable on ring 61 with its outer portion fixed to gear 53. Gears 53 and 54 cause the outer portion to maintain the rotationless attitude of sphere 60.* Connected to *the inner portion of* Selsyn 90 by means of frame 91 is arc 62. The neutral center of arc 62 moves in the direction of the displaced brushes and eventually overtakes them, breaking electrical contact between the brushes and the electrical strips on the arc and causing motor 68 to stop. Connected to frame 91 at axis M is connecting rod 92 and arm 93. Connecting rod 92 moves piston 94 (Fig. 6b) through a viscous fluid within cylinder 95. Cylinder 95 is in effect mounted on the main structure of the aircraft. Arm 93 is connected to tension spring 98 which is also in effect mounted on the main structure of the aircraft.

Selsyn 90 tends to duplicate upon arc 62 the motion of control-thrust units 87 and 88. The forces of the tension of spring 98 and of the fluid friction in cylinder 95, however, prevents it from doing so. The fluid friction causes the motion of arc 62 to lag in its tendency to overtake the brushes. The spring tension tends to move arc 62 in a direction away from its neutral position with respect to the aircraft. *In the illustrative example it is to be noted that as the aircraft approaches the desired heading, the control automatically reverses. The amount of reversal is proportional to: (1) the magnitude of the change of direction that is being made, (2) the speed of rotation of the aircraft, and (3) the aircraft's angular proximity to the directed attitude or heading.*

*These three tendencies are brought about respectively by the following three mechanical provisions: (1) The over-center spring 98 exerts a force tending to cause arc 62 to overtake brushes 63 to 66 and thereby provides a tendency for the control to reverse in proportion to the magnitude of the initial movement of the control. The greater this control movement, the greater the force tending toward reversal. (2) The piston and cylinder 94 and 95 provide a force which the rotating aircraft exerts on arc 62, tending to cause it to overtake the brushes and reverse the control. This stage of the control cycle is illustrated in Figs. 6c and 6d. Arc 62 tends to be rotationless with the gyrosphere 60. The aircraft, however, is rotating and its rotation imparts a force through piston and cylinder 94 and 95 to arc 62. The greater the rate of the aircraft's rotation, the greater the force tending toward reversal. (3) The electromagnetic force of the Selsyns tends to align arc 62 with the direction of control thrust units 87 and 88. The angular movement of these units in either direction from neutral is limited by their mechanical linkage on the structure*

*of the aircraft. Arc 62 is therefore indirectly limited, in its movement to overtake the attitude of the brushes. However, as the structure of the aircraft rotates into closer proximity with the attitude of the brushes, the limits of movement of arc 62 (indirectly, through the Selsyns) change to allow arc 62 to overtake the brushes. The closer the attitude of the aircraft to the directed heading, the sooner reversal tends to occur.*

Figure 6B:
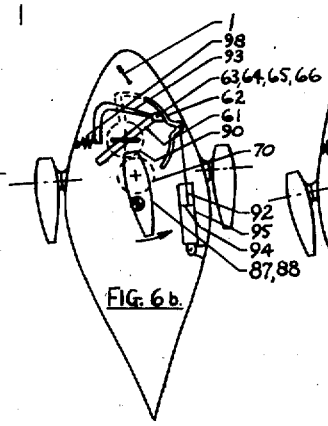
Figure 6C:
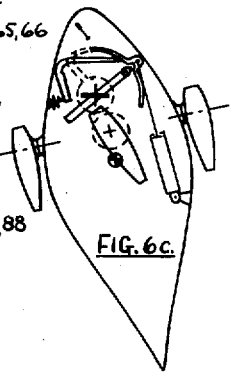
Figure 6D:
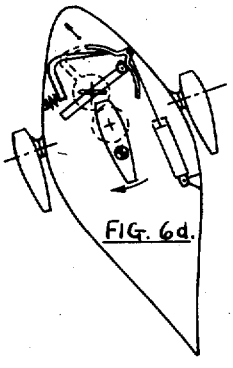

As shown in Figure 6b, ring 61 is in the position governed by, and previously set upon the attitude control lever; brushes 63 and 64 are displaced along arc 62; control-thrust units 87 and 88 are moving toward an angle with the aircraft's longitudinal axis which causes the aircraft to accelerate angularly about a transverse axis; arc 62 is being moved by Selsyn 90 and its motion is tending toward a duplication of the motion of control-thrust units 87 and 88; fluid friction in cylinder 95 is retarding the motion of arc 62 with respect to and in the direction [of the] of the rotational motion of the aircraft; and spring 98 is tending to pull arc 62 to a greater displacement (with respect to the angular position of the aircraft) from its original neutral position.

As shown in Figure 6c, ring 61 and brushes are in the position last previously set by the attitude control lever; the angular movement of unit 88 (with respect to the aircraft) is at a stop as the neutral center of arc 62 overtakes the brushes on ring 61; control-thrust units 87 and 88 are displaced at an angle with the aircraft's longitudinal axis; the rotational motion of the aircraft is in a counterclockwise direction; due to the retarding action of the fluid friction on the motion of arc 62, and the resulting lag between Selsyns 70 and 90, Selsyn 90 and arc 62 continue to rotate in a counterclockwise direction with respect to the aircraft; the action of spring 98 is also aiding this counterclockwise rotation of arc 62.

As shown in Figure 6d, the neutral center of arc 62 and the brushes 63 to 66 are displaced so as to cause motor 68 to reverse and rotate units 87 and 88 toward an angle which causes the aircraft's counterclockwise rotation to decelerate; the action of Selsyn 70 and 90 is tending to move arc 62 clockwise; the action of spring 98 is tending to retard the clockwise rotation of arc 62; the counterclockwise rotation of the aircraft is causing cylinder 95, through the piston and connecting rod, to exert a delaying force against the rotation of arc 62. These three forces, namely the force of Selsyn 90, the force of the spring tension, and the force of fluid friction, result eventually in a clockwise rotation of the neutral center of arc 62 with respect to the brushes 63 to 66 as shown in Fig. 6e, and beyond the brushes as shown in Fig. 6f.

Figure 6E:
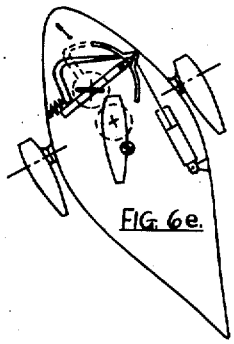

As shown in Figure 6e, the neutral center of arc 62 overtakes the brushes 63 to 66 and causes motor 68, units 87 and 88, and Selsyn 70 to stop; Selsyn 90 rotates arc 62 clockwise to overtake the angular position of the now motionless Selsyn 70; spring 98 exerts a small retarding force on arc 62; the aircraft's counterclockwise motion exerts a force on piston 94, but the continual yielding of the fluid and movement of the piston through the cylinder allows the force of Selsyn 90 to rotate arc 62 to the position shown in Fig. 6f.

Figure 6F:
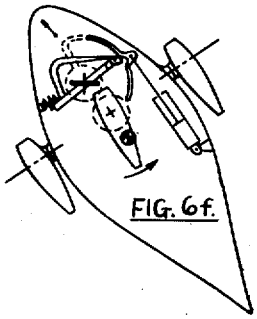

As shown in Figure 6f, the electrical contact between arc 62 and the brushes causes motor 68, units 87 and 88 and Selsyn 70 to rotate toward the neutral position of units 87 and 88; the aircraft's rate of counterclockwise rotation is now approaching zero; there is a negligible force of spring 98 on arc 62; Selsyn 90 and the neutral center of arc 62 move toward brushes 63 to 66.

Figure 6G:
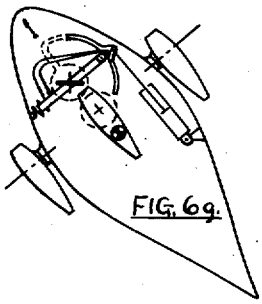
Figure 6H:
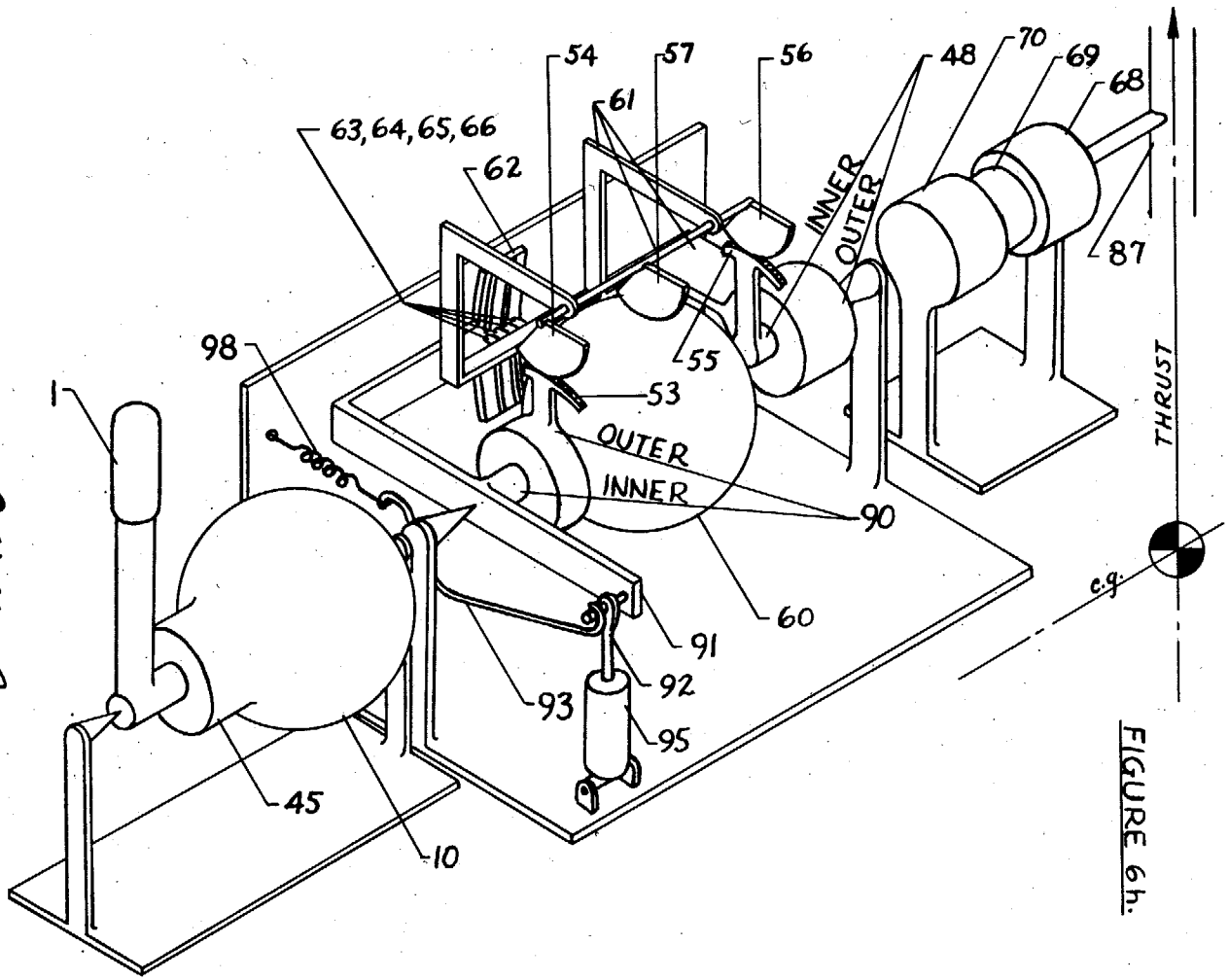

As shown in Figure 6g, the neutral center of arc 62 is aligned with the brushes; all mechanical parts are motionless; and the aircraft is heading in the direction last set on the attitude control lever.

Whenever the direction of the aircraft deviates from the direction set on the attitude control lever, a subsequent displacement of the neutral center of arc 62 with the brushes 63 to 66 causes units 87 and 88 to be rotated and thereby to bring about a rotation of the aircraft toward the set direction.

In a manner identical to the above explained manner of pitch control, the aircraft is controlled in yaw, the difference in the respective mechanisms for pitch and yaw being that (1) the control-thrust units are displaced 90° about the longitudinal axis of the aircraft (see units 100 and 101 in Fig. 5); (2) the automatic mechanism for yaw (located in the center of unit B, Figure 9) is likewise displaced 90° about the longitudinal aixs of the aircraft; and (3) to operate Selsyn 49, the wheels 22 and 23 are caused to be rotated by motion of the sphere 10 through the gear 46 and shaft 47.

Further differences in the mechanism are that (1) control-thrust units 100 and 101 are moved respectively in opposite directions by motor 105, shaft 106, universal joints 107 and 108, two bevel gears at 90° in housing 110 which rotate hollow shafts 111 carrying nuts 112 and 113 with respective right-hand and left-hand threads which simultaneously move shafts 115 and 116 both inward or both outward; (2) the automatic mechanism for roll (located at the bottom of unit B Fig. 9) is displaced 90° from the attitude of either of the pitch or yaw mechanisms; and (3) wheels 20 and 21 carry the motion of sphere 10 to Selsyn 132 (Fig. 7b) as follows. The motion of wheel 20 is transmitted through shaft 118, gear 121, gear 122 and shaft 120 to gear 123 in differential unit 117. The motion of wheel 21 is transmitted through shaft 119 to gear 125 in differential unit 117. When wheels 20 and 21 rotate in the same direction, as in the case when the aircraft yaws, the motion of the above gears is transmitted no further than the internal gears of differential 117.

A change in the setting of an aircraft attitude about the longitudinal axis is accomplished by an angular movement of control lever 1 about axis C. This motion is transmitted by shaft 134 to the stator of Selsyn 132, causing an angular displacement between the stator and rotor. A suitable amount of friction between the stator and rotor keeps the stator-rotor displacement set until it is again changed by the pilot's motion of control lever 1. The stator-rotor displacement is transmitted electrically to Selsyn 133 in the automatic mechanism shown in the lower portion of Figure 9. The resulting automatically controlled motion of the aircraft moves frame 5, frame 3 and shell 2 about axis C while wheels 20 and 21, differential 117, Selsyn 132, lever 1, etc. remain in the angularly motionless attitude of sphere 10.

In the above explanation of automatic control of pitch, yaw and roll, each plane of control is treated individually. It may be seen that a pilot's motion of the attitude control lever combining any or all of the three planes of control will cause to be brought about three appropriate actions at the three automatic mechanisms, resulting in motions of the control-thrust units which will align the direction of the aircraft with that of the attitude control lever.

If, for any reason such as slippage of the composite wheels on sphere 10 or a movement of the attitude of sphere 10, the static directions of the aircraft and the attitude control lever do not coincide, realignments in any of the three control planes may be made at three corresponding adjustment knobs. Realignment of the roll setting of the attitude control lever may be made at knob 140 which is connected to a worm and gear, and which, when turned, rotates handle 1 with respect to shaft 134. Realignment of the pitch setting of the attitude control lever may be made at knob 141 which is connected to worm 42 and gear 43 and which, when turned, displaces the rotor of Selsyn 45 with shaft 40. A similar realignment of the yaw setting of the attitude control lever may be made at Selsyn 49.

Adjustments in the character of the automatic action, that is, the shape of the aircraft's angular acceleration vs. time curve, may be made by: (1) regulation of the tension of spring 98; (2) regulation of the viscosity of the fluid in cylinder 95; (3) regulation of the size of the various electrical resistances on arc 62 such as resistance 156; and/or (4) regulation of the size and mechanical advantage of the various mechanical parts.

2. MODIFIED CONTROL MECHANISM FOR AN AIRCRAFT DESIGNED TO FULFILL THE REQUIREMENTS OF TWO DISTINCT MANNERS OF FLIGHT, VIZ., AT THE WILL OF THE PILOT, TO BE POSSESSED OF EITHER A MANUALLY CONTROLLABLE ATTITUDE OR AN AUTOMATICALLY MAINTAINED CONSTANT HORIZONTAL ATTITUDE

The control mechanism for the aircraft (Figures 10, 11, and 12) designed to maintain either a controllable or a continuously horizontal attitude is the same mechanism as the one described in part IV, 1, above, with the following exceptions:

(1)The four control-thrust units, instead of being mounted on the fuselage structure at the top, bottom, right and left sides, are mounted on a structure which is rotatable with respect to the fuselage of the aircraft as illustrated in Figures 10 and 11. The control-thrust unit supporting structure 160 is illustrated in Figure 10 in the rotational configuration for variable aircraft attitude flight. Structure 160 is shown in Figure 11 in the rotational configuration for an automatically maintained horizontal attitude.

(2) Unit B, instead of being fixed to the main structure of the aircraft, is mounted on control-thrust unit supporting structure 160. (See Figures 5, 10 and 11.)

(3) Unit B is mounted on structure 160 in an attitude rotated 45° about its major axis K.

(4) The part of unit A (Figure 7) which contains composite wheels 22, 23, 24 and 25 and Selsyns 45 and 49 is disposed 45° about axis C from the position shown in Figure 7, so that a purely pitching motion of control lever 1 about axis A or a purely yawing motion about axis B (see Figures 3 and 3a) induces equal components of motion upon the two Selsyns 45 and 49 and thereby upon the displacement between the gyroscope-containing spheres and the brush-containing rings at the two automatic control mechanisms located in the upper and middle portions of unit B. (See Figure 9.) A motion of attitude control lever 1 combining pitch and yaw produces appropriate corresponding combinations of displacements and subsequent automatic actions at the two above mentioned automatic control mechanisms. (The yaw control mechanism and action remains the same as described in part IV, par. 1, above.)

(5) The entire control mechanism as illustrated in Figure 15 except unit A, pump P and air pressure tank 6 is attached to and rotates with the rotatable structure 160.

(6) An additional mechanism, consisting of unit C, generator 161, motor 162, nut 163 and screw 164 is incorporated, the combined purpose of which is to enable the fuselage of the aircraft to be automatically and continuously rotated to the angle with structure 160 that will cause the fuselage to be approximately horizontal.

Described below is the control mechanism of the aircraft illustrated in Figures 10 to 15, with the configuration for controllable attitude flight. With regard for simplicity in explaining the functioning of the control mechanism, it is supposed that a diagonal, upward to the left motion of control lever 1 is made. Such a motion, it will be seen, will move only one Selsyn in unit B and only two of the control-thrust units.

It is supposed that attitude control lever 1 is rotated diagonally upward to the left. Composite wheels 22 and 23, as explained previously, turn the rotor of Selsyn 49 and bring about an automatic action in the upper mechanism of unit B like the action illustrated in Figures 6a to g. By the electrical current supplied by generator 67, motor 68 rotates hollow shaft 165 and nut 166, pulling threaded shaft 167 pulls with it shafts 168 and 187 which rotate respective bell cranks 169 and 170, push rod 171 and pull rod 172. Rod 171 rotates arm 173 and gear 174 about axis N. Gear 174 rotates gear 175 and control-thrust unit 176 about axis O. In this manner and in the manner of automatic control illustrated in Figures 6a to g, control-thrust units 176 and 177 rotate about their respective axes O and P to cause the aircraft to be angularly accelerated and decelerated so that its longitudinal axis will align itself with the direction of the attitude control lever.

In a similar manner, it may be seen from the mechanism shown in Figure 15, that a diagonal, upward to the right movement of the attitude control lever would, by means of the mechanism in the center of unit B, bring about a similar fuselage-to-control-lever alignment.

Vertical and horizontal changes in the direction of the control lever cause appropriate actions in the upper and center automatic mechanisms of unit B to bring about the directed changes in the aircraft's pitch and yaw attitude. (See Figures 13a and 13b.)

Rotating the control handle of unit A about axis C, and thereby changing the directional setting of the handle, causes the four control-thrust units to be rotated in such a way as to produce a like rotation and change in the roll attitude of the aircraft. The roll control mechanism is the same as the one described in part IV, par. 1, except that motor 105, by means of shaft 106, gear train in housing 180 and universal jointed shafts 181 and 182 rotates the gears and nuts in the two housings 183 and 184, instead of the one housing 110. Each of the mechanisms contained in housings 183 and 184 function in the same way as the mechanism in housing 110 described in part IV, par. 1. Referring to the mechanism shown in Figure 15, it may be seen that rotation of shaft 106 of motor 105 causes each of the four control-thrust units to be rotated about their respective axes in a direction which causes the aircraft to roll about its longitudinal axis. (See Figure 13c.)

With the mechanical configuration for automatically maintained horizontal attitude (see Figure 11), the control mechanism and its function is fundamentally the same as explained above except that it is the control-thrust units and their supporting structure 160 which tends to align itself with the attitude control lever, while the angular relationship between the fuselage and the control-thrust unit supporting structure is controlled automatically to keep the fuselage roughly horizontal. (See Figure 12c.)

The mechanics of control of the aircraft in either the controllable attitude configuration shown in Figures 10 and 13 and the automatically maintained horizontal attitude configuration shown in Figures 11 and 14 has this common characteristic, viz., the attitude in space of the control-thrust unit supporting structure tends to be automatically aligned with the attitude in space of the attitude control lever, the only differences between the effects of control in the two configurations being (1) with the aircraft in the configuration of Figures 10 and 13, the fuselage of the aircraft is held motionless with respect to the control-thrust unit supporting structure and therefore moves with it and itself tends to conform to the attitude of the attitude control lever, and (2) with the aircraft in the configuration of Figures 11 and 14, the fuselage of the aircraft remains substantially horizontal, and is affected by certain motions of the attitude control lever as illustrated in Figures 14a, to c and as explained in (a) to (c) below.

Figure 12A:
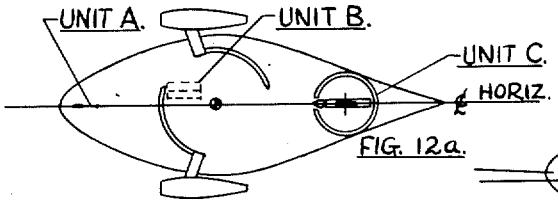
Figure 12D:
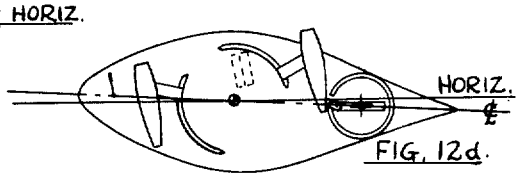
Figure 12B:
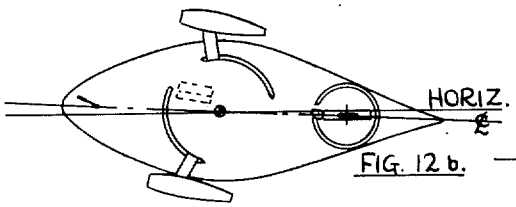
Figure 12E:
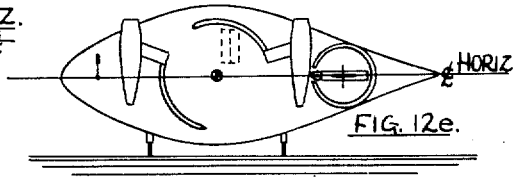
Figure 12C:
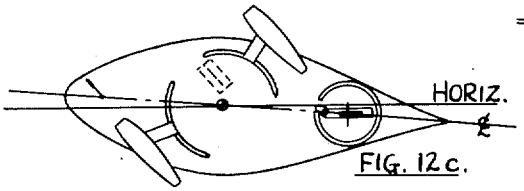

(a) A forward movement of the control lever causes initial movements of the control-thrust units shown in Figure 14a, and a subsequent alignment of their supporting structure with the direction of the control lever, such as illustrated in Figures 12a to e. The horizontal component of the combined thrust of the four control-thrust units moves the aircraft forward. With the aircraft as shown in Figure 12e, a rearward movement of the control lever causes the aircraft and control-thrust unit supporting structure to tilt slightly to the rear. A small horizontal thrust component of the four control-thrust units moves the aircraft slowly to the rear.

(b) A sideward movement of the control lever causes the movements of the control-thrust units shown in Figure 14b and a subsequent slight tilting and horizontal motion of the aircraft in the direction of the control lever movement.

(c) A rotating movement of the control lever about its axis C causes the initial movements of the control-thrust units shown in Figure 14c, and a subsequent alignment of the aircraft with the changed direction of the handle of the control lever.

The mechanism for automatic maintenance of a horizontal fuselage attitude is shown in Figures 15 and 16. The operation of unit C is represented schematically in Figures 12a to c. If it is desired that the mechanism function to cause the fuselage to remain in a horizontal attitude, the electrical circuit at switch 190 is closed and gyroscope 196 in unit C is un-caged. (See Figures 15 and 16.) Direct current flows from battery 71 to arc 197 in unit C. Arc 197 is similar in electrical construction to arc 62, shown isometrically in Figure 9 and schematically in Figure 7. Current passes from the tracks on arc 197 to two of the brushes 211, 212, 213 and 214 on ring 198. Two electrical conductors connected to the four brushes, as similar to the wiring of the four brushes 63 to 66 shown in Figure 8, lead to the field winding of generator 161 which is powered by source of rotation 157. The armature winding of generator 161 is connected to the armature winding of motor 162. The field current of motor 162 is supplied by battery 71. Motor 162 turns shaft 200, clutch 191, and hollow shaft and powered nut 163. Nut 163 rotates and moves screw 164 along its axis, and in doing so, changes the angular relationship between the fuselage of the aircraft and structure 160.

When the aircraft, by the effect of its thrust forces or an outside disturbance, is tilted about its lateral axis a few degrees away from a horizontal attitude, two of the four brushes come in contact with two of the four conductors on arc 197 and cause direct current of a certain polarity to flow to the field winding of generator 161. This polarity is such as to cause motor 162, mounted on the fuselage structure at axis R, to rotate in a direction which will move the fuselage of the aircraft about axis Q of structure 160 toward a horizontal attitude.

The purpose of clutch 191, or a similar device, is one of preventing structure 160 from being moved beyond the two limiting positions of its movement with respect to the fuselage of the aircraft.

The function of clutch 191 is one of disengaging hollow shaft and nut 163 from a rotation of shaft 200 which would move structure 160 beyond either one of its limiting positions, yet at the same time remaining engaged to transmit a rotation of shaft 200 which would not move structure 160 beyond one of its limiting positions.

The construction of clutch 191 consists of a hollow slotted shaft extension of shaft 200; two clutch shoe wheels 201 and 202 having opposite internal ratchets, as shown in section X—X, which are designed to transmit rotations, each in an opposite direction from the other, of shaft 200 to friction disc 203. The two clutch-shoe wheels 201 and 202 are forced against friction discs 203 by springs 204 and 205. Along the longitudinal axis of the clutch, and recessed within a hollow portion of screw 164 is rod 206. At each end of rod 206 is a flange. The flange at the end of rod 206 within screw 164 and the length of the recessed portion of screw 164 are designed to allow the screw to move its allowable length of travel along rod 206 without causing structure 160 to exceed its limiting positions with respect to the fuselage of the aircraft. The flange at the end of the rod 206 which is within the hollow extension of shaft 200 is situated between the ends of the four protruding parts of each clutch-shoe wheel extending inwardly through the slots in the hollow extension of shaft 200.

The operation of clutch 191 is as follows. While motor 162 moves screw 164 through hollow shaft 163 to any position except its two limiting positions, both clutch-shoe wheels 201 and 202 are held against disc 203 by springs 204 and 205, thereby engaging the clutch to transmit rotation of shaft 200 to shaft 163 in either direction. As screw 164 reaches either one of its limiting positions, rod 206 with its flanges at each end is forced against the four protruding parts of the clutch-shoe wheel whose ratchet design would permit it to transmit a rotation which would cause screw 164 to override its limiting position. This clutch-shoe wheel is thereby forced against its spring (either 204 or 205) by rod 206, and is disengaged from disc 203. The inner portion of the other clutch-shoe wheel rotates with shaft 200 and turns freely on the ratchet within the motionless outer portion of the wheel. As soon as shaft 200 turns in a direction which would move screw 164 away from its limiting position, the force exerted by rod 206 on one of the clutch-shoe wheels is released and both clutch-shoe wheels are again forced against disc 203, and the clutch is engaged to transmit rotation in either direction.

What is claimed is:

1. In a craft having freedom of attitude about its three principal axes, a mechanical means for directing such attitude and for directing and controlling such attitude, said means comprising a plurality of gyroscopes contained within a sphere of the planes of rotation of which are held in a fixed relationship with one another and mutually perpendicular to one another, a means for spinning said gyroscopes in their respective planes of rotation, a lever like control object which is rotatable about three mutually perpendicular axes whose common point of intersection coincides with the center of said sphere, a means for suspension of said sphere such that its geometric center is held at said common intersection of the three mutually perpendicular axes, the means for suspension being a structure containing suitable bearing surfaces which engirdle and enclose the sphere, said suspension means including a means for detecting and measuring the components of rotation with respect to the sphere and said lever about each of its three mutually perpendicular axes, said means for detection and measurment being composed of three wheels which have their axes of rotation disposed and fixed parallel, respectively, to the three mutually perpendicular axes of said lever and their surfaces in rolling contact with the surface of said sphere, said means for detection and measurement being such that the three components of rotation of the sphere with respect to the three mutually perpendicular axes of the lever are represented proportionally by the motions of the three corresponding wheels, respectively, three Selsyn transmitters for directing and transmitting to a remote and separate mechanism the motion of said three wheels, respectively, a means for suspension and attachment of said lever to the craft consisting of a pivotal attachment of said lever to said suspension structure which is in turn pivotally attached to the craft, the axes of rotation of the two pivotal attachments being perpendicular to each other.

2. In a craft having freedom of attitude about its three principal axes, a mechanical means for directing the craft's attitude about two of these axes, namely its vertical and lateral axes, and for directing and controlling changes in the craft's attitude about these two axes, said means comprising a plurality of gyroscopes contained within a sphere the planes of rotation of which are held in a fixed relationship with one another and mutually perpendicular to one another, a means for spinning said gyroscopes in their respective planes of rotation, a lever like control object which is rotatable about two mutually perpendicular axes whose common point of intersection coincides with the center of said sphere, a means for suspension of said sphere such that its geometric center is held at said common intersection of the two mutually perpendicular axes, the means of suspension being a structure containing suitable bearing surfaces which engirdle and enclose the sphere, said suspension means including a means of detecting and measuring the components of rotation with respect to the sphere and said lever about each of its two mutually perpendicular axes, said means for detection and measurement being composed of two wheels which have their axes of rotation disposed and fixed parallel, respectively, to the two mutually perpendicular axes of said lever and their surfaces in rolling contact with the surface of said sphere, said means for detection and measurement being such that the two components of rotation of the sphere with respect to the two mutually perpendicular axes of the lever are represented proportionally by the motions of the two corresponding wheels, two Selsyn transmitters for directing and transmitting to a remote and separate mechanism the motion of said two wheels, respectively, a means for suspension and attachment of said lever to the craft consisting of a pivotal attachment of said lever to said suspension structure which is in turn pivotally attached to the craft, the axes of rotation of the two pivotal attachments being perpendicular to one another.

*3. In a craft having freedom of attitude about any of its three principal axes, a mechanical means for automatically maneuvering said craft about a given axis to conform to an attitude setting, including means for preserving said attitude setting comprising a plurality of gyroscopes contained within a sphere the planes of precisionary rotation of which are held in a fixed relationship with one another and mutually perpendicular to one another, a member containing electrical contact brushes on an attitude selective hinge held at rotational selection to said sphere by a wheel-like friction device and mounted on said craft, said automatically maneuvering means comprising variable electrical resistance tracks contacted by said brushes and hingedly mounted on the aircraft to follow the arc of said brushes, said tracks connected pivotally and off-center from the hinged mounting to the aircraft by a dashpot-like link and by an overcenter spring, directive means rotatively mounted on said craft, a motor electrically connected to said tracks to rotate said directive means, follow-up mechanism comprising a pair of self-synchronous motors, one mounted on the aircraft and connected to said directive means, the other connected to said tracks, the second exerting a tendency to duplicate the rotation of the first and to cause the center of said tracks to follow up said brushes.*

*4. In a craft having freedom of attitude about any of its three principal axes, a mechanical means for automatically maneuvering said craft about a given axis to conform to an attitude setting, including means for preserving said attitude setting comprising a plurality of gyroscopes contained within a sphere the planes of precisionary rotation of which are held in a fixed relationship with one another and mutually perpendicular to one another, a member containing electrical contact brushes on an attitude selective hinge held at rotational selection to said sphere by a wheel-like friction device and mounted on said craft, said automatically maneuvering means comprising variable electrical resistance tracks contacted by said brushes and hingedly mounted on the aircraft to follow the arc of said brushes, said tracks connected pivotally and off-center from the hinged mounting to the aircraft by a dashpot-like link, jet-like directive means rotatively mounted on said craft, a motor electrically connected to said tracks to rotate said directive means, follow-up mechanism comprising a pair of self-synchronous motors, one mounted on the aircraft and connected to said directive means, the other connected to said tracks, the second exerting a tendency to duplicate the rotation of the first and to cause the center of said tracks to follow up said brushes.*

References Cited in the file of this patent or the original patent

UNITED STATES PATENTS

| | | |
|---|---|---|
| 1,239,837 | Sperry | Sept. 11, 1917 |
| 1,851,764 | Hahn | Mar. 29, 1932 |
| 1,951,817 | Blount | Mar. 20, 1934 |
| 2,284,902 | Hosford | June 2, 1942 |
| 2,321,572 | Campbell | June 15, 1943 |
| 2,396,309 | Wodal | Mar. 12, 1946 |
| 2,416,097 | Hansen | Feb. 18, 1947 |
| 2,471,821 | Kutzler | May 31, 1949 |

FOREIGN PATENTS

| | | |
|---|---|---|
| 657,557 | France | Jan. 16, 1929 |